(12) United States Patent
De Lima (10) Patent No.: US 12,207,375 B2
(45) Date of Patent: Jan. 21, 2025

(54) DIMMABLE LED LAMPS

(71) Applicant: SIGNIFY HOLDING B.V., Eindhoven (NL)

(72) Inventor: Shane Felix Elias De Lima, Billerica, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 136 days.

(21) Appl. No.: 18/026,048

(22) PCT Filed: Sep. 7, 2021

(86) PCT No.: PCT/EP2021/074601
§ 371 (c)(1),
(2) Date: Mar. 13, 2023

(87) PCT Pub. No.: WO2022/058202
PCT Pub. Date: Mar. 24, 2022

(65) Prior Publication Data
US 2023/0371159 A1  Nov. 16, 2023

Related U.S. Application Data (60) Provisional application No. 63/079,594, filed on Sep. 17, 2020.

(30) Foreign Application Priority Data

Sep. 24, 2020  (EP) .................................... 20198061

(51) Int. Cl.
*H05B 47/195* (2020.01)
*H05B 45/10* (2020.01)
*H05B 45/325* (2020.01)

(52) U.S. Cl.
CPC ........... *H05B 47/195* (2020.01); *H05B 45/10* (2020.01); *H05B 45/325* (2020.01)

(58) Field of Classification Search
CPC ...... H05B 45/10; H05B 45/325; H05B 47/19; H05B 45/20; H05B 45/3725;
(Continued)

(56) References Cited

U.S. PATENT DOCUMENTS 9,699,855 B2    7/2017  Maa et al.
2007/0229300 A1 10/2007 Masato et al.
(Continued)

FOREIGN PATENT DOCUMENTS

WO   2016199101 A2   12/2016
WO   2017036771 A1    3/2017
(Continued)

OTHER PUBLICATIONS

How IR Repeater Systems Work https://www.audioholics.com/home-theater-connection/how-ir-repeater-systems-work.
(Continued)

*Primary Examiner* — Monica C King (57) ABSTRACT

A dimmable LED lamp is provided, including an accessory, an end cap, and LEDs. The accessory includes a wireless receiver and an IR emitter. The wireless receiver receives a wireless dimming signal. The IR emitter transmits an IR signal corresponding to the wireless dimming signal. The dimmable LED lamp includes an end cap. The end cap includes an IR sensor, an MCU, and a driver circuit. The IR sensor receives the IR signal and transmits a corresponding sensor signal. The MCU receives the sensor signal and transmits a corresponding dimming control signal. The driver circuit receives an AC mains power signal from the AC mains power supply, receives the dimming control signal, and generates an LED power signal based on the AC
(Continued)

mains power signal and having a duty cycle corresponding to the dimming control signal. The LEDs receive the LED power signal.

15 Claims, 5 Drawing Sheets

(58) Field of Classification Search
CPC ...... H05B 47/195; H05B 45/37; H05B 47/11; H05B 47/105; H05B 47/10; H05B 45/38; H05B 45/375; H05B 45/14; H05B 47/115; H05B 45/46; H05B 45/00; H05B 45/395; H05B 47/16; H05B 45/50; H05B 45/385; H05B 45/12; H05B 47/155; H05B 47/175; H05B 45/30; H05B 45/48; H05B 47/18; H05B 45/44; H05B 47/185; H05B 45/345; H05B 47/165; H05B 47/1965; H05B 45/382; H05B 45/18; H05B 45/56; H05B 45/40; H05B 47/17; H05B 45/31; H05B 45/39; H05B 45/22; H05B 47/125; H05B 45/397; H05B 45/355; H05B 47/196; H05B 47/12; H05B 45/24; H05B 45/3575; H05B 47/13; H05B 45/59; H05B 45/36; H05B 47/199; H05B 45/60; H05B 47/1985; H05B 47/20; H05B 45/34; H05B 45/32; H05B 45/28; H05B 47/14; H05B 39/044; H05B 45/3578; H05B 45/327; H05B 47/198; H05B 47/24; H05B 45/305; H05B 45/42; H05B 45/357; H05B 47/197; H05B 45/58; H05B 47/25; H05B 45/54; H05B 45/3577; H05B 44/00; H05B 45/335; H05B 45/315; H05B 39/048; H05B 45/52; H05B 47/1975; H05B 47/22; H05B 45/33; H05B 39/08; H05B 47/28; H05B 47/187; H05B 41/36; H05B 39/04; H05B 41/3924; H05B 31/50; H05B 47/1995; H05B 33/10; H05B 35/00; H05B 45/3574; H05B 39/042; H05B 45/347; H05B 47/29; H05B 47/135; H05B 47/183; H05B 45/35; H05B 41/3921; H05B 39/041; H05B 45/392; H05B 33/12; H05B 41/2828; H05B 39/088; H05B 41/38; H05B 47/26; H05B 41/39; H05B 41/3927; H05B 39/047; H05B 47/184; H05B 39/086; H05B 47/00; H05B 41/392; H05B 41/3925; H05B 39/02; H05B 41/295; H05B 33/02; H05B 41/28; H05B 39/06; H05B 41/3922; H05B 41/40; H05B 41/14; H05B 41/282; H05B 41/2827; H05B 41/30; H05B 47/21; H05B 47/235; H05B 39/083; H05B 33/22; H05B 47/172; H05B 47/23; H05B 3/54; H05B 39/09; H05B 39/045; H05B 39/085; H05B 41/02; H05B 41/32; H05B 33/06; H05B 33/00; H05B 33/14; H05B 41/2882; H05B 41/2885; H05B 41/325; H05B 41/46; H05B 33/26; H05B 1/023; H05B 3/0085; H05B 41/24; H05B 41/245; H05B 41/2822; H05B 41/2851; H05B 41/34; H05B 41/44; H05B 6/06; H05B 33/04; H05B 39/00; H05B 41/2806; H05B 41/2855; H05B 41/2981; H05B 3/20; H05B 41/04; H05B 41/2824; H05B 41/285; H05B 41/2928; H05B 41/2983; H05B 6/10; H05B 6/105; H05B 2203/032; H05B 3/0033; H05B 3/008; H05B 3/02; H05B 33/145; H05B 33/28; H05B 41/26; H05B 41/2825; H05B 41/2856; H05B 41/382; H05B 41/388; H05B 41/391; H05B 6/6435

See application file for complete search history.

(56) References Cited

U.S. PATENT DOCUMENTS

| 2008/0272319 | A1 | 11/2008 | Keh et al. |
| 2019/0013960 | A1* | 1/2019 | Sadwick ............... H05B 47/19 |
| 2019/0354381 | A1 | 11/2019 | Takacs et al. |

FOREIGN PATENT DOCUMENTS

| WO | 2017036848 A1 | 3/2017 |
| WO | 2017036998 A1 | 3/2017 |
| WO | 2018041923 A1 | 3/2018 |
| WO | 2018197205 A1 | 11/2018 |

OTHER PUBLICATIONS

Remote Control Extender Kit https://bafxpro.com/collections/audio-visual/products/wireless-ir-repeater-remote-control-extender-kit.

* cited by examiner

DIMMABLE LED LAMPS

CROSS-REFERENCE TO PRIOR APPLICATIONS

This application is the U.S. National Phase application under 35 U.S.C. § 371 of International Application No. PCT/EP2021/074601, filed on Sep. 7, 2021, which claims the benefit of European Patent Application No. 20198061.2, filed on Sep. 24, 2020, and U.S. Provisional Patent Application Ser. No. 63/079,594, filed on Sep. 17, 2020. These applications are hereby incorporated by reference herein.

FIELD OF THE DISCLOSURE

The present disclosure is directed generally to light emitting diode (LED) lamps equipped for dimming via an infrared (IR) interface in an attachable accessory.

BACKGROUND

Commercial lighting industry group Design Lights Consortium (DLC) recently released new requirements to promote energy efficient lighting solutions. In these new requirements, all lamps covered by DLC must be capable of dimming, though not necessarily configured to be dimmable in all applications. An example of such a lamp is an Underwriters Laboratories (UL) Type B tubular light emitting diode (TLED) lamp. A UL Type B TLED lamp connects directly to the AC mains power of a receiving luminaire, bypassing any ballast circuitry. Consequently, the lamp and luminaire lack dimming infrastructure, such as dimming control wires.

As consumers begin to replace their old fluorescent lamps with LED lamps, UL Type B TLED lamps are gaining popularity, primarily because they eliminate the need of a ballast. However, many customers are looking for inexpensive solutions when retrofitting. Consequently, cost-sensitive consumers may avoid purchasing smart/connected lamps installed with connected lighting systems. Accordingly, there is a need for a basic dimmable, retrofit LED lamp which can subsequently be incorporated into a connected lighting system with other LED lamps.

SUMMARY OF THE DISCLOSURE

The present disclosure is directed generally to a light emitting diode (LED) lamp equipped for dimming via an infrared (IR) interface in an attachable accessory. The dimmable LED lamp includes a wireless accessory and an end cap attached to the LED tube, as well as one or more LEDs. In a preferred example, the wireless accessory includes a wireless receiver configured to receive a wireless dimming signal. The wireless accessory then transmits an IR signal via an IR emitter to an IR sensor of the end cap. The IR sensor generates a sensor signal based on the received IR signal, and transmits the sensor signal to a microcontroller (MCU). The MCU generates a dimming control signal based on the received sensor signal, and transmits the dimming control signal to a driver circuit electrically coupled to an alternating-current (AC) mains power supply and the LEDs. The driver circuit generates an LED power signal based on an AC mains power signal. The LED power signal is a pulse width modulation (PWM) signal with a duty cycle corresponding to the dimming control signal. The LED power signal is then provided to the LEDs to drive them at a dimming level corresponding to the wireless dimming signal received by the attachable accessory. In a further example, the accessory may generate a synchronization signal corresponding to the wireless dimming signal. This synchronization signal may be provided to secondary accessories attached to secondary dimmable LED lamps. Like the wireless accessory described above, these secondary accessories control the dimming level of the associated LEDs by transmitting a secondary IR signal via an IR emitter to the IR sensors of the secondary dimmable LED lamps. Accordingly, a user may simultaneously control the dimming level of multiple LED lamps through the transmission of a wireless dimming signal.

Generally, in one aspect, a dimmable LED lamp is provided. The dimmable LED lamp may include an accessory. The accessory may include a wireless receiver. The wireless receiver may be configured to receive a wireless dimming signal. According to an example, the wireless dimming signal may be a radio frequency (RF), Wi-Fi, Bluetooth, or Zigbee signal. According to a further example, the wireless dimming signal may be transmitted by a remote control device. The remote control device may be a smartphone or network gateway.

The accessory may also include an IR emitter. The IR emitter may be configured to transmit an IR signal. The IR signal may correspond to the wireless dimming signal.

The dimmable LED lamp may include an end cap. The end cap may include a controller circuit. The controller circuit may include an IR sensor. The IR sensor may be configured to receive the IR signal. The IR sensor may also be configured to transmit a sensor signal. The sensor signal may correspond to the IR signal.

According to an example, the end cap may also include an IR lens. The IR lens may be configured to direct the IR signal transmitted by the IR emitter to the IR sensor. In a further example, the IR lens may be positioned one inch or less from the IR emitter.

The controller circuit may also include an MCU. The MCU may be configured to receive the sensor signal. The MCU may also be configured to transmit a dimming control signal. The dimming control signal may correspond to the sensor signal.

According to an example, the controller circuit may also include an auxiliary power supply. The auxiliary power supply may be configured to receive a driver power supply signal. The driver power supply signal may be received from the driver circuit.

The auxiliary power supply may be further configured to generate the low-voltage power supply signal. The low-voltage power supply signal may be based on the driver power supply signal.

The auxiliary power supply may be further configured to transmit the low-voltage power supply signal. The low-voltage power supply signal may be transmitted to the low-voltage connector, the IR sensor, and/or the MCU.

The end cap may also include a driver circuit. The driver circuit may be electrically coupled to an alternating-current (AC) mains power supply. The driver circuit may also be electrically coupled to the MCU. The driver circuit may be configured to receive an AC mains power signal from the AC mains power supply. The driver circuit may also be configured to receive the dimming control signal. The driver circuit may also be configured to generate an LED power signal. The LED power signal may be based on the AC mains power signal. The LED power signal may be a pulse width modulation (PWM) signal. The LED power signal may have a duty cycle corresponding to the dimming control signal. According to an example, the driver circuit and the AC mains power supply may be electrically coupled via a thermal fuse.

According to an example, the driver circuit may include a relay circuit. The relay circuit may be configured to enable and/or disable the driver circuit. The driver circuit may be enabled and/or disabled based on a relay signal. The relay signal may be transmitted by the MCU. The relay signal may correspond to the IR signal.

According to an example, the end cap may also include a low-voltage connector. The low-voltage connector may be configured to provide a low-voltage power signal to the accessory.

The dimmable LED lamp may include one or more LEDs. The one or more LEDs may be electrically coupled to the driver circuit. The one or more LEDs may be configured to receive the LED power signal.

According to another aspect, a system of connected dimmable LED lamps is provided. The system may include a primary dimmable LED lamp. The system may also include a secondary dimmable LED lamp.

Both the primary dimmable LED lamp and the secondary dimmable LED lamp may include an end cap. The end cap may include a controller circuit. The controller circuit may include an IR sensor. The IR sensor may be configured to receive a primary IR signal or a secondary IR signal. The IR sensor may be further configured to transmit a sensor signal. The sensor signal may correspond to the received primary IR signal or secondary IR signal.

The controller circuit may include an MCU. The MCU may be configured to receive the sensor signal. The MCU may be configured to transmit a dimming control signal. The dimming control signal may correspond to the sensor signal.

The end cap may further include a driver circuit. The driver circuit may be electrically coupled to an AC mains power supply. The driver circuit may also be coupled to the MCU.

The driver circuit may be configured to receive an AC mains power signal from the AC mains power supply. The driver circuit may be further configured to receive the dimming control signal. The driver circuit may be further configured to generate an LED power signal. The LED power signal may be based on the AC mains power signal. The LED power signal may be a PWM signal. The LED power signal may have a duty cycle corresponding to the dimming control signal. According to an example, the duty cycle of the LED power signal of the primary dimmable LED lamp may be equal to the duty cycle of the LED power signal of the secondary dimmable LED lamp.

Both the primary dimmable LED lamp and the secondary dimmable LED lamp may include one or more LEDs. The one or more LEDs may be electrically coupled to the driver circuit. The one or more LEDs may be configured to receive the LED power signal.

The primary dimmable LED lamp may further include a primary accessory. The primary accessory may include a wireless receiver. The wireless receiver may be configured to receive a wireless dimming signal. According to an example, the wireless receiver may be a node of a networked lighting system.

The primary accessory may also include a primary IR emitter. The primary IR emitter may be configured to transmit the primary IR signal. The primary IR signal may correspond to the wireless dimming signal.

The primary accessory may also include a primary accessory MCU. The primary accessory MCU may be configured to transmit a synchronization signal. The synchronization signal may correspond to the wireless dimming signal.

The secondary dimmable LED lamp may also include a secondary accessory. The secondary accessory may include a secondary accessory MCU. The secondary accessory MCU may be communicatively coupled to the primary accessory MCU. The secondary accessory MCU may be configured to receive the synchronization signal. According to an example, the primary accessory MCU and secondary accessory MCU may be communicatively coupled via a wired connection.

The secondary accessory may also include a secondary IR emitter. The secondary IR emitter may be configured to transmit a secondary IR signal. The secondary IR signal may correspond to the synchronization signal.

According to another aspect, a method for dimming an LED lamp is provided. The method may include receiving, by a wireless receiver, a wireless dimming signal. The method may further include transmitting, via an IR emitter, an IR signal corresponding to the wireless dimming signal. The method may further include receiving, by an IR sensor, the IR signal. The method may further include transmitting, via the IR sensor, a sensor signal corresponding to the IR signal. The method may further include receiving, by an MCU, the sensor signal. The method may further include transmitting, via the MCU, a dimming control signal corresponding to the sensor signal. The method may further include receiving, by a driver circuit, an AC mains power signal from an AC mains power supply. The method may further include receiving, by a driver circuit, the dimming control signal. The method may further include generating, via a driver circuit, an LED power signal based on the AC mains power signal, wherein the LED power signal is a pulse width modulation signal having a duty cycle corresponding to the dimming control signal. The method may further include receiving, by one or more LEDs of the LED lamp, the LED power signal.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure is directed generally to a light emitting diode (LED) lamp equipped for dimming via an infrared (IR) interface in an attachable accessory. The dimmable LED lamp includes a wireless accessory and an end cap attached to an LED tube, as well as one or more LEDs. In a preferred example, the wireless accessory includes a wireless receiver configured to receive a wireless dimming signal via radio frequency (RF), Wi-Fi, Bluetooth, or Zigbee transmission. The wireless accessory then transmits an IR signal via an IR emitter to an IR sensor of the end cap via an IR lens. The IR lens is preferably an inch or less from the IR emitter. The IR sensor generates a sensor signal based on the received IR signal, and transmits the sensor signal to a microcontroller (MCU). The MCU generates a dimming control signal based on the received sensor signal, and transmits the dimming control signal to a driver circuit electrically coupled to an alternating-current (AC) mains power supply and the LEDs of the LED tube. The driver circuit generates an LED power signal based on an AC mains power signal from the AC mains power supply. The LED power signal is a pulse width modulation signal (PWM) with a duty cycle corresponding to the dimming control signal. The LED power signal is then provided to the LEDs to drive them at a dimming level corresponding to the wireless dimming signal received by the attachable accessory. The end cap may also include a low-voltage connector configured to supply a low-voltage power supply signal to the wireless accessory. The low-voltage power supply signal may be generated by an auxiliary power supply of the end cap.

In a further example, the accessory may generate a synchronization signal corresponding to the wireless dimming signal. This synchronization signal may be provided to secondary accessories attached to secondary dimmable LED lamps via a wired connection. Like the wireless accessory described above, these secondary accessories control the dimming level of the associated LEDs by transmitting a secondary IR signal via an IR emitted to the IR sensors of the secondary dimmable LED lamps. Accordingly, a user may simultaneously control the dimming level of multiple LED lamps through the transmission of a wireless dimming signal via a remote control device, such as a smartphone or a network gateway.

Figure 1A:
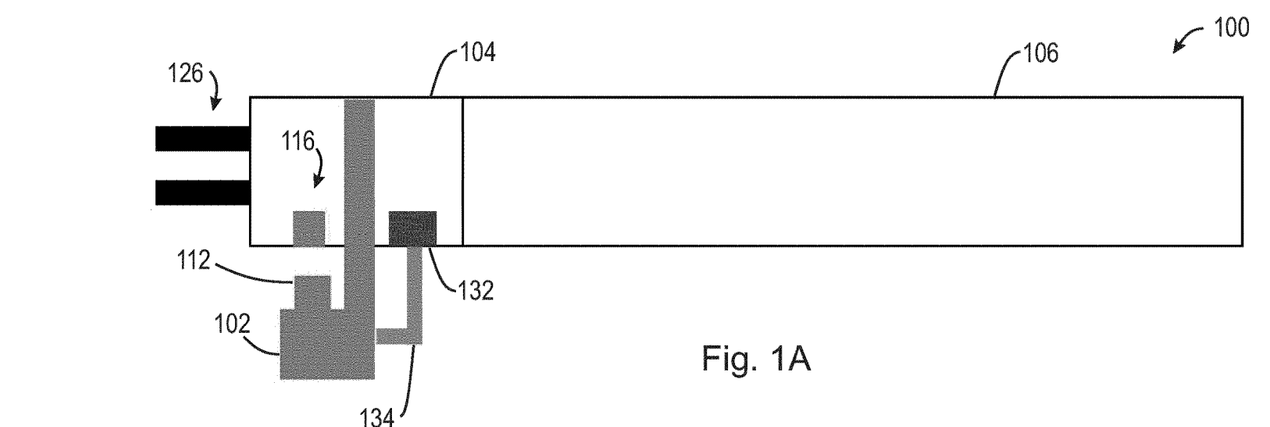
FIG. 1A is a schematic of a dimmable light emitting diode (LED) lamp, in accordance with an example.
Figure 1B:
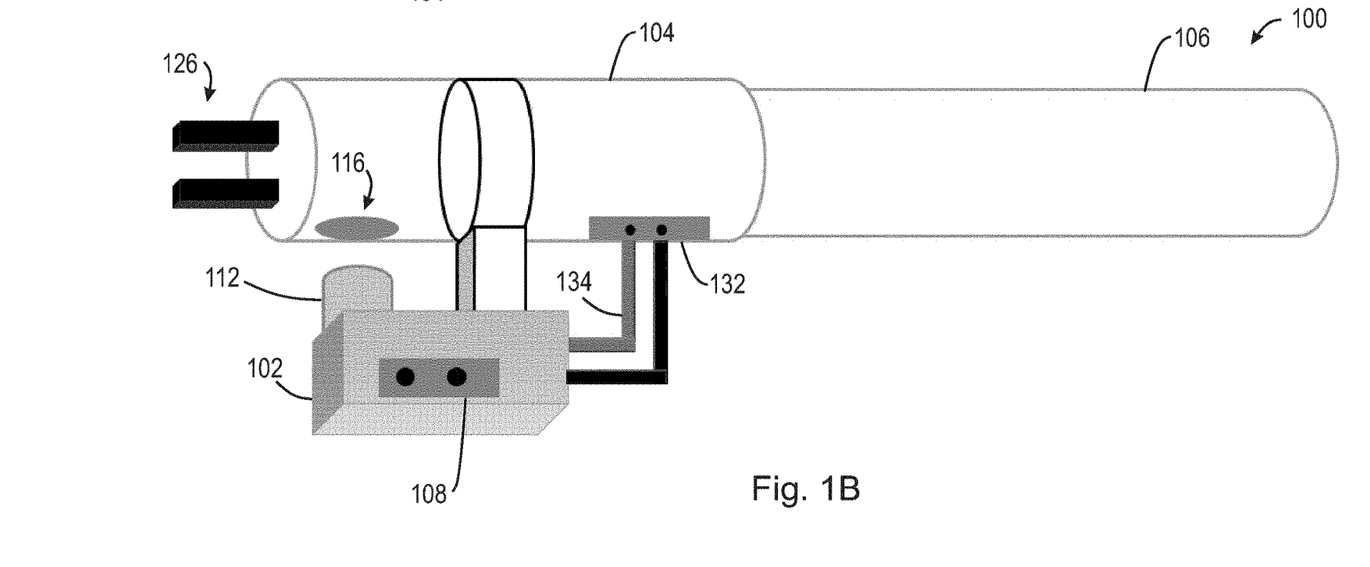
FIG. 1B is a three dimensional view of a dimmable LED lamp, in accordance with an example.

Generally, in one aspect, a dimmable LED lamp 100 is provided. FIG. 1A shows a schematic of an example dimmable LED lamp 100, while FIG. 1B shows a three-dimensional rendering of the same dimmable LED lamp 100. The dimmable LED lamp 100 may include an accessory 102, an end cap 104, and one or more LEDs 106. The dimmable LED lamp 100 may connect directly to the AC mains power supply 126, thus obviating the need for a ballast for regulating the voltage and current provided to the LEDs 106. In a preferred example, the dimmable LED lamp 100 may be an Underwriters Laboratories (UL) Type B tubular LED (TLED) lamp. Alternatively, the dimmable LED lamp 100 may be a UL Type A TLED lamp or a UL Type C TLED lamp. The dimmable LED lamp 100 may be retrofit to operate in an existing lighting fixture which previously housed one or more fluorescent tube lights.

Figure 2A:
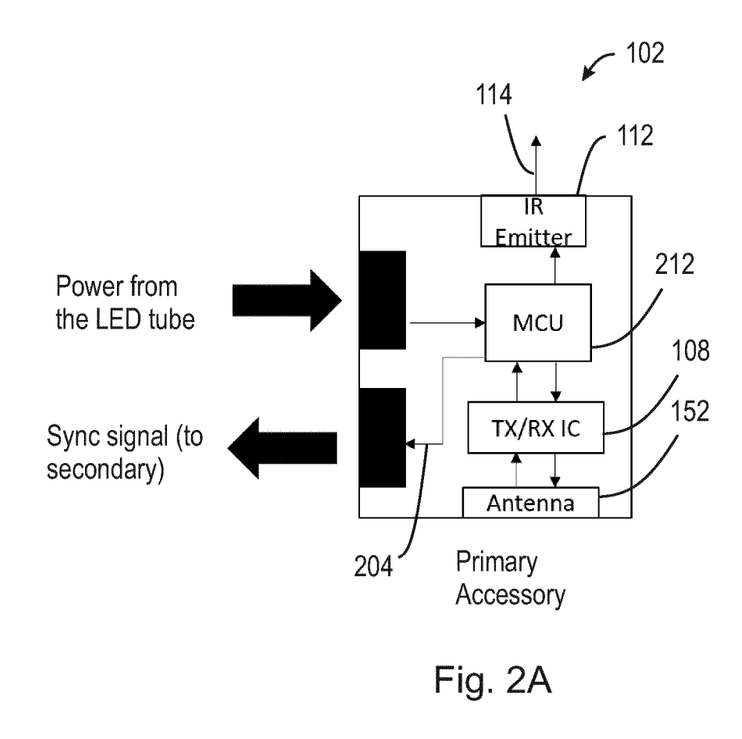
FIG. 2A is a schematic of a primary accessory for a dimmable light emitting diode LED lamp, in accordance with an example.

FIG. 2A shows a schematic of an example accessory 102. As shown in FIG. 1B, the accessory 102 may be attached to the end cap 104 of the dimmable LED lamp 100. The accessory 102 may include a wireless receiver 108. The wireless receiver 108 may be configured to receive a wireless dimming signal 110 via antenna 152. The wireless dimming signal 110 may contain information regarding the desired dimming level of the dimmable LED lamp 100. For example, the wireless dimming signal 110 may contain commands for the dimmable LED lamp 100 to incrementally increase or decrease dimming. In another example, the wireless dimming signal 110 may contain commands for the dimmable LED lamp 100 to dim to a specific dimming level, such as 33%, 50%, or 75%, wherein 100% dimming results in no light being emitted.

Figure 4:
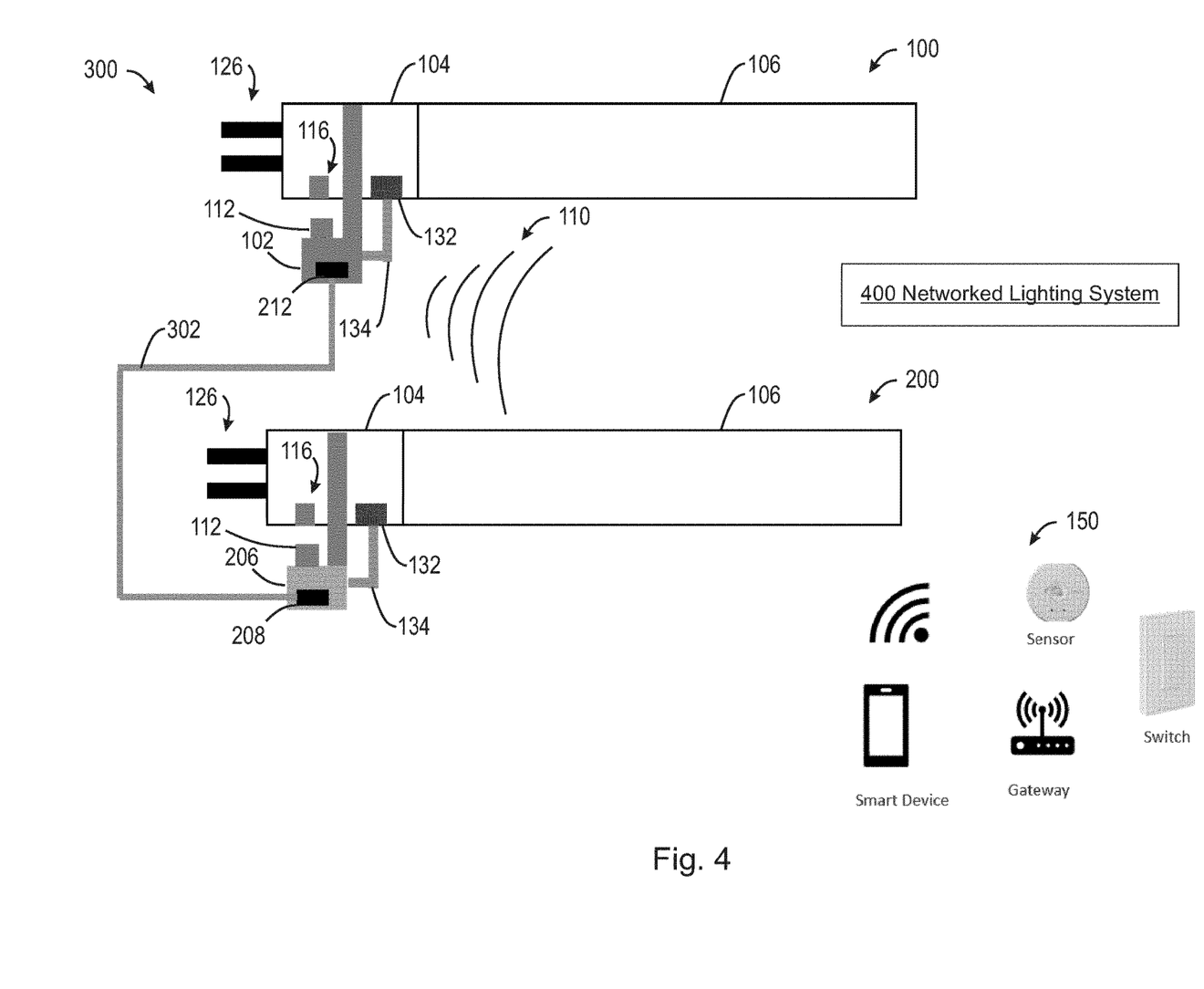
FIG. 4 is a schematic of a system of connected dimmable LED lamps, in accordance with an example.

According to an example, the wireless dimming signal 110 may be a radio frequency (RF), Wi-Fi, Bluetooth, or Zigbee signal, or any other type of wireless signal appropriate for the present disclosure. According to a further example, the wireless dimming signal 110 may be transmitted by a remote control device 150. As shown in FIG. 4, the remote control device 150 may be a smartphone, network gateway, sensor, switch, or any other types of device capable of transmitting a wireless dimming signal 110 to the wireless receiver 108.

The accessory 102 may also include an IR emitter 112. The IR emitter 112 may be configured to transmit an IR signal 114. The IR signal 114 may correspond to the wireless dimming signal 110. As shown in FIG. 2A, the accessory 102 may receive the wireless dimming signal 110 via antenna 152 and wireless receiver 108. The wireless receiver 108 then transmits the wireless dimming signal 110 to MCU 212. The MCU 212 then triggers the IR emitter 112 to transmit an IR signal 114 corresponding to the wireless dimming signal 110.

In an example, the dimmable LED lamp 100 is initially installed without the accessory 102. Without the accessory 102, the dimmable LED lamp 100 may still illuminate and dim based on signals received from other IR-enabled devices. The accessory 102 may be added to the dimmable LED lamp 100 post-installation to add the lamp 100 to a networked lighting system 400.

Figure 3:
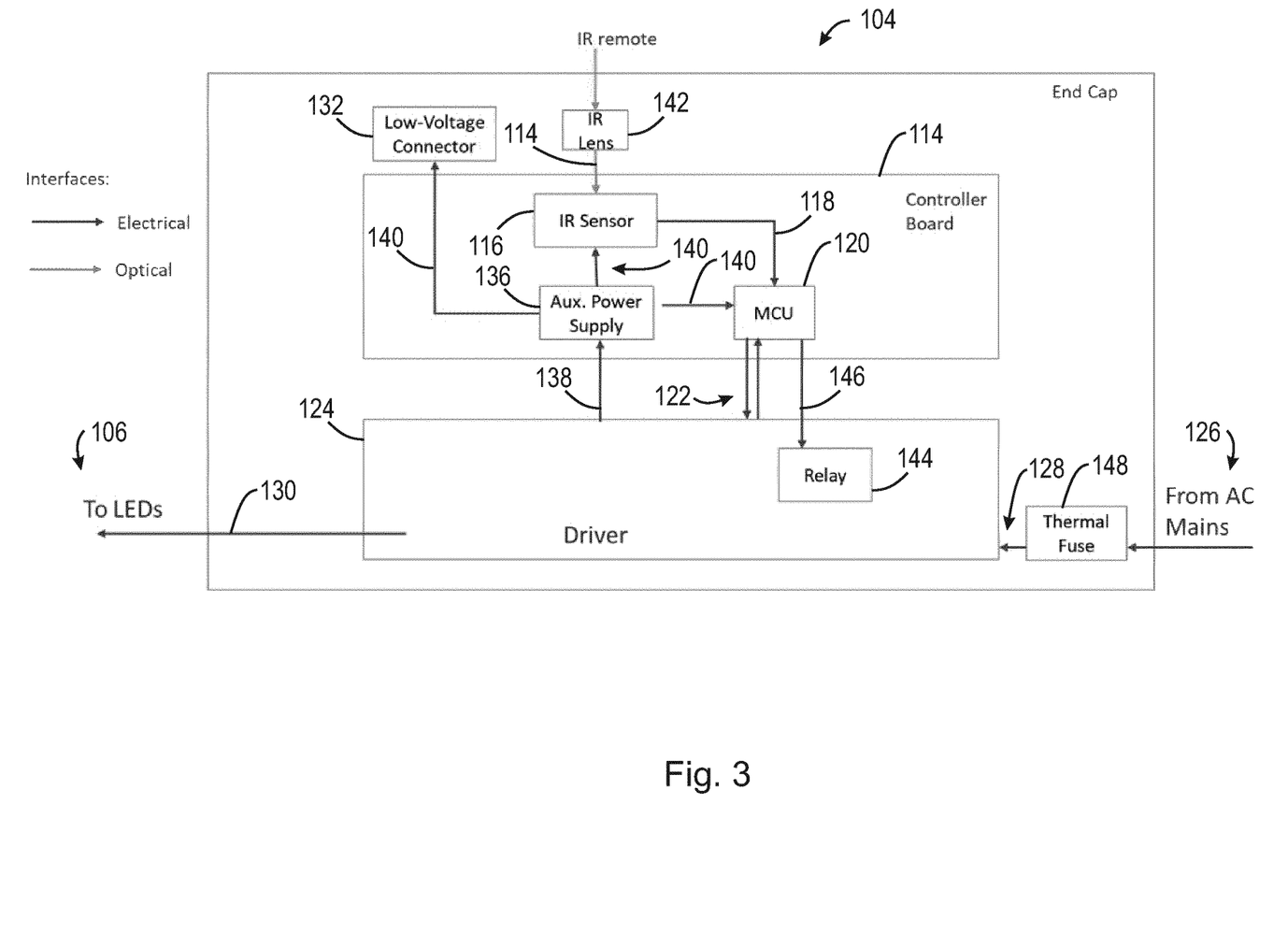
FIG. 3 is a schematic of an end cap for a dimmable light emitting diode LED lamp, in accordance with an example.

The dimmable LED lamp 100 may include an end cap 104. As shown in FIGS. 1A, 1B, and 3, the end cap 104 functions as an intermediary between the AC mains power supply 126, the accessory 102, and the LEDs 106. The end cap 104 receives an AC mains power signal 128 from the AC mains power supply 126, modulates that signal 128 into a PWM signal with a duty cycle 132 corresponding to the wireless dimming signal 110, and powers the LEDs 106 using that PWM signal. Accordingly, the LEDs 106 will have a brightness corresponding to the wireless dimming signal 110 transmitted by the remote control device 150.

According to an example, and as shown in FIG. 3, the end cap 104 may include a low-voltage connector 132. The low-voltage connector 132 may be configured to provide a low-voltage power signal 134 to the accessory 102. FIGS. 1A and 1B show an example of the connection conveying the low-voltage power signal 134 from the low-voltage connector 132 of the end cap 104 to the accessory 102. As shown in FIG. 2A, the low-voltage power signal 134 may be conveyed to the MCU 212 of the accessory 102.

As shown in FIG. 3, the end cap 104 may include a controller circuit 114, a driver circuit 146, an IR lens 142, and a thermal fuse 148. The controller circuit 114 may include an IR sensor 116. The IR sensor 116 may be configured to convert the infrared generated by the IR emitter 112 to an electrical signal. Accordingly, the IR sensor 116 may be configured to receive the IR signal 114 transmitted by the IR emitter 112 of the accessory 102. The IR sensor 116 may also be configured to transmit a sensor signal 118. The sensor signal 118 may correspond to the IR signal 114.

According to an example, the end cap 104 may also include an IR lens 142. The IR lens may be configured to direct the IR signal 114 transmitted by the IR emitter 112 to the IR sensor 116. The physical gap between the IR lens 142 and the IR emitter 114 should be narrow enough to prevent scattering of the IR signal 114 transmitted by the emitter 112. If the gap is too wide, other, adjacent dimmable LED lamps 100 may accidently receive the IR signal and adjust their brightness to an undesired level. In a further example, the IR lens 142 may be positioned one inch or less from the IR emitter 112.

The controller circuit 114 may also include an MCU 120. The MCU 120 may be configured to provide control signals to aspects of the driver circuit 124. For example, the MCU 120 may be configured to receive the sensor signal 118. The MCU 120 may also be configured to transmit a dimming control signal 122. The dimming control signal 122 may correspond to the sensor signal 118. The dimming control signal 122 may then be used by the driver circuit 122 to configure the LED power signal 130 to dim the LEDs 106 to the desired level.

According to an example, and as shown in FIG. 3, the controller circuit 114 may also include an auxiliary power supply 136. The auxiliary power supply 136 may be configured to receive a driver power supply signal 138. The driver power supply signal 138 may be received from the driver circuit 124.

The auxiliary power supply 136 may be further configured to generate the low-voltage power supply signal 140. The low-voltage power supply signal 140 may be based on the driver power supply signal 138. The low-voltage power supply signal 140 may be approximately 0.5 V. The auxiliary power supply 136 may be further configured to transmit the low-voltage power supply signal 140 to the low-voltage connector 132, the IR sensor 116, and/or the MCU 120.

As shown in FIG. 3, the driver circuit 124 may be electrically coupled to an AC mains power supply 126. The AC mains power supply 126 is representative of the power a residential or commercial building provides via wall outlets. In North America, the signal provided by the AC mains power supply 126 may have a voltage of 120 VAC and a frequency of 60 Hz. In a further example, the voltage of the signal produced by the AC mains power supply 126 may range from 120 VAC to 277 VAC, inclusive. The frequency of this signal may also be 60 Hz.

The driver circuit 124 may also be electrically coupled to the MCU 120. The driver circuit 124 may be configured to receive the AC mains power signal 128 from the AC mains power supply 126.

The driver circuit 124 may also be configured to receive the dimming control signal 122. The driver circuit 124 may also be configured to generate an LED power signal 130. The LED power signal 130 may be based on the AC mains power signal 128. The LED power signal 130 may be a PWM signal with a duty cycle 132 corresponding to the dimming control signal 122. Accordingly, by controlling the duty cycle 132 of the LED power signal 130, the MCU 120 effectively controls the brightness of the LEDs powered by the LED power signal 130.

According to an example, the driver circuit 124 and the AC mains power supply 126 may be electrically coupled via a thermal fuse 148. The thermal fuse 148 may be configured to break the connection between the driver circuit 124 and the AC mains power supply 126 when resistive heat generated by the current of the AC mains power signal 128 surpasses a threshold.

According to an example, the driver circuit 124 may include a relay circuit 144. The relay circuit 144 may be configured to enable and/or disable the driver circuit 124. The driver circuit 124 may be enabled and/or disabled based on a relay signal 146. The relay signal 146 may be transmitted by the MCU 120. The relay signal 144 may correspond to the IR signal 114. In an example, the IR signal 114, which corresponds to the wireless dimming signal 110, may contain additional data regarding the desired ON/OFF state of the dimmable LED lamp 100. Accordingly, this data may be used by the MCU 120 and the relay circuit 144 to quickly turn the dimmable LED lamp 100 ON or OFF without dimming the lamp 100 ON or OFF.

The dimmable LED lamp 100 may include one or more LEDs 106. The one or more LEDs 106 may be electrically coupled to the driver circuit 124. The one or more LEDs 106 may be configured to receive the LED power signal 130. The LEDs 106 may be configured as TLEDs.

According to another aspect, and as shown in FIG. 4, a system 300 of connected dimmable LED lamps may be provided. The system 300 may include a primary dimmable LED lamp 100 and a secondary dimmable LED lamp 200. In this aspect, the primary dimmable LED lamp 100 receives a wireless dimming signal 110 sent by a remote control device 150. The primary accessory 102 then dims the primary dimmable LED lamp 100 according to the wireless dimming signal 110, as described above. The primary accessory 102 also transmits a synchronization signal 204 to the secondary accessory 206 of the secondary dimmable LED lamp 200. The secondary accessory 206 then dims the secondary dimmable LED lamp 200 in a similar manner as the primary dimmable LED lamp 100. In a further example, the synchronization signal 204 may be sent to a plurality of secondary dimmable LED lamps 200, allowing a user or remote network to simultaneously control a large number of dimmable LED lamps 100, 200 as part of a networked lighting system 400.

The primary 100 and secondary 200 dimmable LED lamps may be identical with the exception of their primary 102 and secondary accessories 206, respectively. Both the primary dimmable LED lamp 100 and the secondary dimmable LED lamp 200 may include an end cap 104. The end cap 104 may include a controller circuit 114. The controller circuit 114 may include an IR sensor 116. The IR sensor 116 may be configured to receive a primary IR signal 114 or a secondary IR signal 202. The IR sensor 116 may be further configured to transmit a sensor signal 118. The sensor signal 118 may correspond to the received primary IR signal 114 or secondary IR signal 202. The controller circuit 114 may include an MCU 120. The MCU 120 may be configured to receive the sensor signal 118. The MCU 120 may be configured to transmit a dimming control signal 122. The dimming control signal 122 may correspond to the sensor signal 118. The end cap 104 may further include a driver circuit 124. The driver circuit 124 may be electrically coupled to an AC mains power supply 126. The driver circuit 124 may also be coupled to the MCU 120. The driver circuit 124 may be configured to receive an AC mains power signal 128 from the AC mains power supply 126. The driver circuit 124 may be further configured to receive the dimming control signal 122. The driver circuit 124 may be further configured to generate an LED power signal 130. The LED power signal 130 may be based on the AC mains power signal 128. The LED power signal 130 may be a PWM signal. The LED power signal 130 may have a duty cycle 132 corresponding to the dimming control signal 122. According to an example, the duty cycle 132 of the LED power signal 130 of the primary dimmable LED lamp 100 may be equal to the duty cycle 132 of the LED power signal 130 of the secondary dimmable LED lamp 200.

Both the primary dimmable LED lamp 100 and the secondary dimmable LED lamp 200 may include one or more LEDs 106. The one or more LEDs 106 may be electrically coupled to the driver circuit 124. The one or more LEDs 106 may be configured to receive the LED power signal 130. The LEDs in the primary 100 and secondary 200 dimmable LED lamps may be the same or different depending on the application. For example, a system 300 may employ a number of secondary dimmable LED lamps 200 with LEDs 106 of different color hues than the primary dimmable LED lamp 100.

The primary dimmable LED lamp 100 may further include a primary accessory 102. The primary accessory 102 may include a wireless receiver 108. The wireless receiver 108 may be configured to receive a wireless dimming signal 110. According to an example, the wireless receiver 108 may be a node of a networked lighting system 400. The networked lighting system 400 may include a number of other lighting devices, including additional primary and secondary dimmable LED lamps 100, 200. These lighting devices may be controlled simultaneously or independently depending on the application.

With reference to FIG. 2A, the primary accessory 102 may also include a primary IR emitter 112. The primary IR emitter 112 may be configured to transmit the primary IR signal 114. The primary IR signal 114 may correspond to the wireless dimming signal 110.

The primary accessory 102 may also include a primary accessory MCU 212. The primary accessory MCU 212 may be configured to transmit a synchronization signal 204. The synchronization signal 204 may correspond to the wireless dimming signal 110. The primary accessory MCU 212 may be powered by the driver circuit 124 of the primary dimmable LED lamp 100.

Figure 2B:
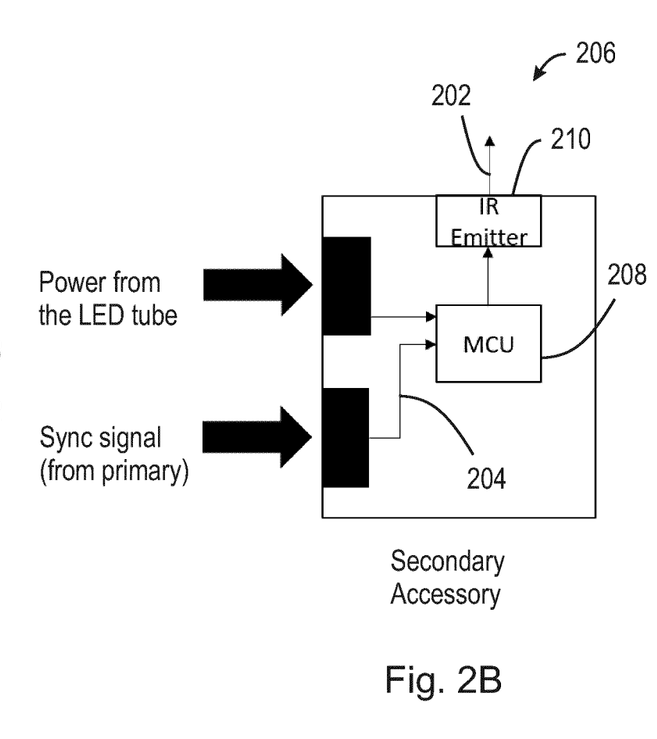
FIG. 2B is a schematic of a secondary accessory for a dimmable light emitting diode LED lamp, in accordance with an example.

The secondary dimmable LED lamp 200 may also include a secondary accessory 206. With reference to FIG. 2B, the secondary accessory 206 may include a secondary accessory MCU 208. The secondary accessory MCU 208 may be communicatively coupled to the primary accessory MCU 212. The secondary accessory MCU 208 may be configured to receive the synchronization signal 204. According to an example, and as shown in FIG. 4, the primary accessory MCU 212 and secondary accessory MCU 208 may be communicatively coupled via a wired connection 302. The secondary accessory 206 may also include a secondary IR emitter 210. The secondary IR emitter may be configured to transmit a secondary IR signal 202. The secondary IR signal 202 may correspond to the synchronization signal 204. Accordingly, the secondary IR signal 202 may be identical to the primary IR signal 114.

Figure 5:
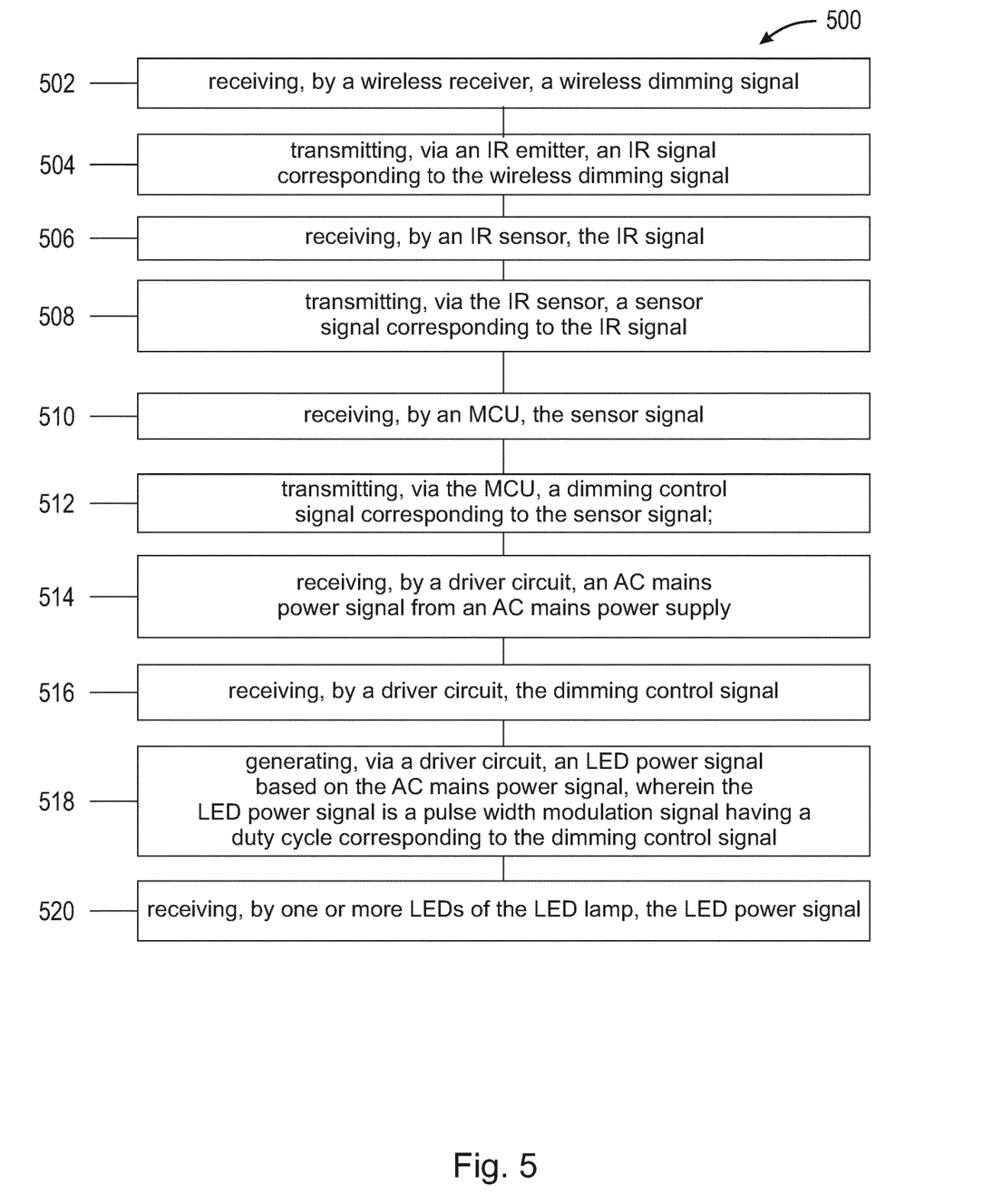
FIG. 5 is a flowchart of a method for dimming an LED lamp, in accordance with an example.

According to another aspect, a method 500 for dimming an LED lamp is provided. The method 500 may include receiving 502, by a wireless receiver, a wireless dimming signal. The method 500 may further include transmitting 504, via an infrared (IR) emitter, an IR signal corresponding to the wireless dimming signal. The method 500 may further include receiving 506, by an IR sensor, the IR signal. The method 500 may further include transmitting 508, via the IR sensor, a sensor signal corresponding to the IR signal. The method 500 may further include receiving 510, by an MCU, the sensor signal. The method 500 may further include transmitting 512, via the MCU, a dimming control signal corresponding to the sensor signal. The method 500 may further include receiving 514, by a driver circuit, an AC mains power signal from an AC mains power supply. The method 500 may further include receiving 516, by a driver circuit, the dimming control signal. The method 500 may further include generating 518, via a driver circuit, an LED power signal based on the AC mains power signal, wherein the LED power signal is a pulse width modulation signal having a duty cycle corresponding to the dimming control signal. The method 500 may further include receiving 520, by one or more LEDs of the LED lamp, the LED power signal.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A system of connected dimmable light emitting-diode lamps, comprising of a primary dimmable LED lamp and a secondary dimmable LED lamp, the primary dimmable LED lamp, comprising:
 a primary accessory, comprising:
  a wireless receiver configured to receive a wireless dimming signal;
  a primary infrared emitter configured to transmit an IR signal corresponding to the wireless dimming signal;
  a primary accessory MCU configured to transmit a synchronization signal corresponding to the wireless dimming signal; and
 the secondary dimmable LED lamp comprising a secondary accessory, comprising:
  a secondary accessory MCU configured to receive the synchronization signal;
  a secondary IR emitter configured to transmit a secondary IR signal corresponding to the synchronization signal; and
 wherein both the primary dimmable LED lamp and the secondary dimmable LED lamp comprise:
  an end cap, comprising:
  a controller circuit, comprising:
   an IR sensor configured to receive the IR signal and transmit a sensor signal corresponding to the IR signal;
   a microcontroller (MCU) configured to receive the sensor signal and transmit a dimming control signal corresponding to the sensor signal; and
   a driver circuit electrically coupled to an alternating-current mains power supply and the MCU, configured to:
    receive an AC mains power signal from the AC mains power supply;
    receive the dimming control signal; and
    generate an LED power signal based on the AC mains power signal, wherein the LED power signal is a pulse width modulation signal having a duty cycle corresponding to the dimming control signal; and
   one or more LEDs electrically coupled to the driver circuit, wherein the one or more LEDs are configured to receive the LED power signal.

2. The primary dimmable LED lamp and secondary dimmable LED lamp of claim 1, wherein the end cap further comprises a low-voltage connector configured to provide a low-voltage power signal to the accessory.

3. The primary dimmable LED lamp and secondary dimmable LED lamp of claim 2, wherein the controller circuit further comprising an auxiliary power supply configured to:
 receive a driver power supply signal from the driver circuit;
 generate the low-voltage power supply signal based on the driver power supply signal;
 transmit the low-voltage power supply signal to the low-voltage connector, the IR sensor, and/or the MCU.

4. The primary dimmable LED lamp and secondary dimmable LED lamp of claim 1, wherein the end cap further comprises an IR lens configured to direct the IR signal transmitted by the IR emitter to the IR sensor.

5. The primary dimmable LED lamp and secondary dimmable LED lamp of claim 4, wherein the IR lens is positioned one inch or less from the IR emitter.

6. The primary dimmable LED lamp and secondary dimmable LED lamp of claim 1, wherein the wireless dimming signal is a radio frequency, Wi-Fi, Bluetooth, or Zigbee signal.

7. The primary dimmable LED lamp and secondary dimmable LED lamp of claim 1, wherein the driver circuit comprises a relay circuit configured to enable and/or disable the driver circuit based on a relay signal transmitted by the MCU, wherein the relay signal corresponds to the IR signal.

8. The primary dimmable LED lamp and secondary dimmable LED lamp of claim 1, wherein the driver circuit and the AC mains power supply are electrically coupled via a thermal fuse.

9. The primary dimmable LED lamp and secondary dimmable LED lamp of claim 1, wherein the wireless dimming signal is transmitted by a remote control device.

10. The primary dimmable LED lamp and secondary dimmable LED lamp of claim 9, wherein the remote control device is a smartphone or network gateway.

11. The system of connected dimmable LED lamps of claim 1, wherein the primary accessory MCU and secondary accessory MCU are communicatively coupled via a wired connection.

12. The system of connected dimmable LED lamps of claim 1, wherein the duty cycle of the LED power signal of the primary dimmable LED lamp is equal to the duty cycle of the LED power signal of the secondary dimmable LED lamp.

13. The system of connected dimmable LED lamps of claim 1, wherein the wireless receiver is a node of a networked lighting system.

14. A method for dimming a primary light emitting diode lamp or a secondary dimmable LED lamp, comprising:
    receiving, by a wireless receiver of the primary dimmable LED lamp, a wireless dimming signal;
    transmitting, via an infrared (IR) emitter of the primary dimmable LED lamp, an IR signal corresponding to the wireless dimming signal;
    receiving, by an IR sensor of the primary dimmable LED lamp, the IR signal;
    transmitting, via the IR sensor, a sensor signal corresponding to the IR signal;
    receiving, by a primary microcontroller of the primary dimmable LED lamp, the sensor signal;
    transmitting, via the primary MCU, a dimming control signal corresponding to the sensor signal;
    receiving, by a driver circuit of the primary dimmable LED lamp, an alternating current mains power signal from an AC mains power supply;
    receiving, by a driver circuit, the dimming control signal;
    generating, via the driver circuit, an LED power signal based on the AC mains power signal, wherein the LED power signal is a pulse width modulation signal having a duty cycle corresponding to the dimming control signal;
    transmitting, by the primary accessory MCU, a synchronization signal corresponding to the wireless dimming signal;
    receiving, by a secondary accessory MCU of the secondary dimmable LED lamp, the synchronization signal, the secondary accessory MCU communicatively coupled to the primary accessory MCU;
    transmitting, by a secondary IR emitter of the secondary dimmable LED lamp, a secondary IR signal corresponding to the synchronization signal; and
    receiving, by one or more LEDs of the primary dimmable LED lamp, the LED power signal.

15. The method of claim 13, further comprising receiving, by one or more LEDs of the secondary dimmable LED lamp, the LED power signal.

* * * * *